United States Patent [19]

Davis et al.

[11] 4,312,318

[45] Jan. 26, 1982

[54] COMBUSTION ENGINE FUEL ECONOMIZER

[75] Inventors: Ken W. Davis, Lyford; Leo B. McCay, LaFeria, both of Tex.

[73] Assignees: Martin P. Ferrero, Trustee; Robert L. Hensz; Martin P. Ferrero, all of Harlingen, Tex.; J. Gibson Semmes, Washington, D.C.

[21] Appl. No.: 142,125

[22] Filed: Apr. 21, 1980

[51] Int. Cl.³ .............................................. F02M 31/00
[52] U.S. Cl. ...................................... 123/546; 123/590
[58] Field of Search ............... 123/523, 546, 590, 547; 48/180 H; 261/144, 145; 165/52

[56] References Cited

U.S. PATENT DOCUMENTS

| 3,762,385 | 10/1973 | Hollnagel | 261/144 |
|---|---|---|---|
| 3,906,914 | 9/1975 | Kirkbride | 123/546 |
| 4,016,847 | 4/1977 | Rychlik | 123/546 |
| 4,031,875 | 6/1977 | Tyler | 123/523 |
| 4,100,899 | 7/1978 | Chilton | 123/546 |
| 4,106,457 | 8/1978 | Totten | 123/546 |

Primary Examiner—Ronald H. Lazarus
Attorney, Agent, or Firm—J. Gibson Semmes

[57] ABSTRACT

A fuel economizing and pollution reducing device for interposition between the conventional carburetor and intake manifold of an internal combustion engine. An exhaust gas heated exchange tube extends through the interior of the device, providing a constriction, or a reduction in the cross-sectional area, of the interior of the device. The fuel-air mixture entering from the carburetor is abruptly directed through this constriction by a deflection plate. Thus, the inducted mixture flowing past the heat exchange tube is subjected to an increase in both heat and velocity, producing improved atomization and vaporization of the fuel in the air. Beyond the heat exchange tube, a turbulent effect is created, promoting further vaporization of the fuel and intermixture of air therewith. In a preferred embodiment, these dual effects are enhanced by a mixing plate which is positioned downstream of the constriction. Thus, the inducted mixture flowing past the heat exchange tube is subjected to an increase in both heat and velocity, producing improved atomization and vaporization of the fuel in the air. Beyond the heat exchange tube, a turbulent effect is created promoting further vaporization of the fuel and intermixture of air therewith. In a preferred embodiment, these dual effects are enhanced by a mixing plate which is positioned downstream of the constriction. The completely vaporized and homogenized mixture thus delivered to the engine maximizes both fuel economy and reduction of harmful exhaust emissions.

8 Claims, 6 Drawing Figures

COMBUSTION ENGINE FUEL ECONOMIZER

BACKGROUND OF THE INVENTION

This invention relates generally to internal combustion engines and, more particularly, to a device, interposable between the carburetor and intake manifold for enhancing vaporization and intermixing of the air-fuel induction mixture to provide both improved fuel economy and reduced emission of pollutants in the engine exhaust.

It is well known that enhanced combustion efficiency can be achieved by increasing vaporization of the fuel in the air carrier and by improving the uniformity or homogenization of the fuel-air mixture delivered to the combustion chambers. Heretofore, many devices have been proposed for realizing either one or both of these objectives.

Some prior art approaches have taken the form of variously configured screens, blades, deflecting plates, and the like which are disposed directly in the air-fuel flow path to effect atomization either through direct collision and physical disperson of the fuel droplets or by imparting a swirling or turbulent movement to the mixture. Other approaches have provided a heating element in or adjacent the combustion mixture intake passages to preheat the mixture immediately before induction into the engine.

Typically such devices have included electrical elements or fluid conduits through which heated engine coolant or exhaust gases are circulated. While devices of this latter type have been somewhat effective, they have not proven entirely satisfactory. One serious drawback of these known devices is over-heating of the air-fuel mixture which results in a reduction in the density of the mixture. Such loss of density produces an enrichment of the mixture which degrades not only fuel economy but also the quality of the engine exhaust, i.e., the extent of the pollutants contained therein.

SUMMARY OF THE INVENTION

The present invention is directed to a device, interposable between the carburetor and intake manifold of an internal combustion engine, for reducing exhaust pollutants and improving fuel economy through increased pre-induction vaporization and mixing of the fuel-air combustion mixture. The invention contemplates the construction of devices adapted for use with all conventionally sized engines and carburetors, without necessitating modification or specialized adjustments thereof.

In detail, the preferred embodiment of the invention is characterized by a housing which defines an internal passageway for conducting a flow of an air-fuel mixture downstream from the carburetor into the manifold. Within the interior of the housing there is provided a baffle assembly which includes a deflection plate and a heat exchanger. The positioning of the heat exchanger is such as to provide a constriction of the internal passageway of the housing. Heat from exhaust gases recirculated through the exchanger is transferred to the mixture as it passes through this constriction. The deflection plate is positioned upstream of the heat exchanger to direct the flow of the intake and air-fuel mixture through the constriction. This constriction, or reduced passageway, causes an increase in velocity of the flow which combines with the affects of the thermal excitation produced by the heat exchange to provide a greatly improved vaporization of the fuel.

After passing the heat exchanger, the mixture undergoes turbulence which is conducive to homogenization and intimate dispersion of the fuel in the air carrier. In a preferred embodiment, this uniform mixing effect is enhanced by a mixing plate which forces a complete reversal of the direction of the flow. After such additional mixing, the combustion mixture is drawn by vacuum into the manifold through a housing outlet which provides a flow path that is substantially aligned with the flow path exiting the carburetor.

Tests conducted during development of the invention have shown that optimum results are obtained when the cross-sectional area of the carburetor outlet is related to the cross-sectional area of the internal passageway at the constriction by a 9.5:1 ratio.

DESCRIPTION OF THE PREFERRED EMBODIMENT

Figure 1:
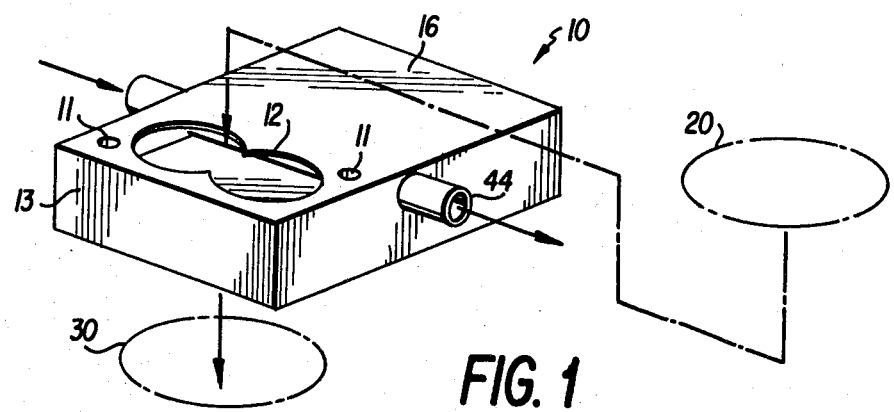
FIG. 1 is a perspective view of the invention.

Referring initially to FIG. 1, there is shown an exploded view of the manner in which the device is mounted between the carburetor 20 and intake manifold 30. The device illustrated is for use with a carburetor having two barrels. Accordingly, the housing inlet port 12 is designed to matingly engage the two barrels of the carburetor. The teachings of the invention, however, are to be understood to have application to engines which have carburetors with other numbers of barrels, e.g., a single-barrel carburetor or a four-barrel carburetor. With such carburetors, inlet port 12 would be shaped and sized for compatible alignment with the particular carburetor used. As discussed in greater detail hereinafter, the total cross-sectional area of the barrels for a given carburetor determine the optimum internal configuration of the device. It will be further appreciated that by similar analogy, the size and shape of housing outlet port 14 will depend upon the carburetor utilized.

Referring to the drawings, the device includes a housing 10 which is a rectangular shape when viewed from the top (FIG. 3), the side (FIG. 2), and the end (FIG. 1). This housing is preferably formed of steel construction for purposes of rigidity as well as for the transfer of heat, as will hereinafter be made apparent. Using a known type of gasket (not shown) carburetor 20 is mounted in a sealing manner upon upper plate 16, the barrels of the carburetor being aligned with inlet port 12. Two sealed through sleeves 11 are provided vertically through the device to receive the mounting bolts between the carburetor and manifold. It will be appreciated that these bolts, which are not shown, will be of suitable size and length to affect a rigid connection between the device, carburetor and manifold.

A suitable gasket is also utilized for mounting the lower plate 18 of the device to the manifold. When so connected, the outlet port has mating aligned connection with the inlet of the intake manifold 30.

Figure 2:
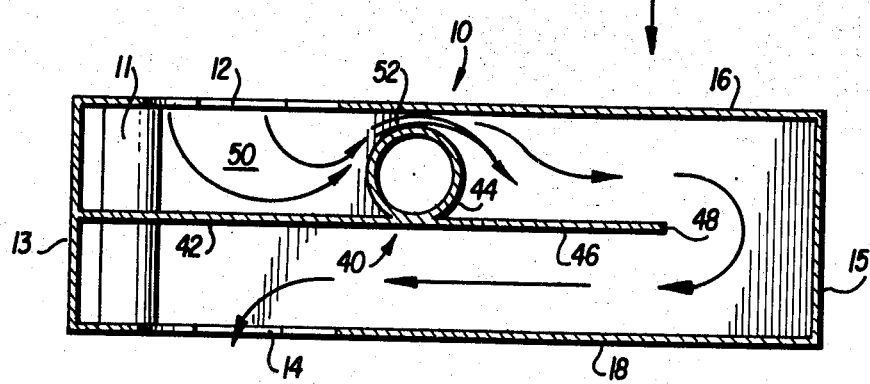
FIG. 2 is a sectional view of the invention in side elevation taken along lines 2—2 at FIG. 3.

As can be seen most clearly from FIG. 2, a baffle assembly generally designated 40 is provided within the interior of the housing 10. As illustrated, an internal passageway 50 exists within the interior of the housing, around baffle assembly 40. Components of the baffle assembly 40 include deflection plate 42, heat exchanger 44, and mixing plate 46. In the embodiment illustrated in FIGS. 2 and 3, heat exchanger 44 is positioned to provide a constriction 52 of the internal passageway between the bottom surface of upper plate 16 and the uppermost surface of heat exchanger 44. Deflection plate 42 is preferably a flat plate which is positioned intermediate the upper plate 16 and the lower plate 18 and in parallel spaced relation thereto. Such positioning of plate 42 deflects the flow of the fuel-air mixture entering the housing from the carburetor through inlet port 12, abruptly redirecting the same through constriction 52. Mixing plate 46 in the FIG. 2 embodiment is in coplanar relationship with deflection plate 42, forming an essentially unitary plate-like structure. As will be discussed in greater detail hereinafter, the invention contemplates disposing mixing plate 46 in different relationships with respect to deflection plate 42 and heat exchanger 44.

Heat exchanger 44 is preferably a hollow cylindrical tube constructed from a good heat conductive metal. This tube extends through housing 10 and generally transverse to the flow of fuel-air mixture through passageway 50. The longitudinal axis of the illustrated tubular heat exchanger lies in a plane which is parallel to the respective planes in which upper plate 16 and lower plate 18 are oriented and, in another plane which is also in parallel relationship with sidewalls 13 and 15. Constriction 52 is of substantially reduced cross-sectional area relative to the cross-sectional area provided in the immediately preceding portion of passageway 50, thus providing an increase in velocity of the flow therethrough.

Heated exhaust gases, taken from any suitable point in the engine exhaust system (not shown), are recirculated through heat exchanger 44. Radiant heat is accordingly transferred from the exchanger to fuel droplets of the air-fuel mixture passing thereby. This thermal transfer combines with the increase in velocity of the flow provided by the constriction 52 to greatly improve vaporization of the fuel. As can be seen most clearly in FIG. 2, a substantial opening is provided between the free edge 48 of mixing plate 46 and sidewall 15. This arrangement induces turbulence which is conducive to homogenization and intimate dispersion of the fuel in the air carrier. In addition to this uniform mixing effect, the expansion that the fuel undergoes in this segment of the device tends to cool the adjacent surfaces of the housing, thus eliminating some of the hazards present in prior art devices which employ pre-induction heating of the fuel-air mixture.

Figure 3:
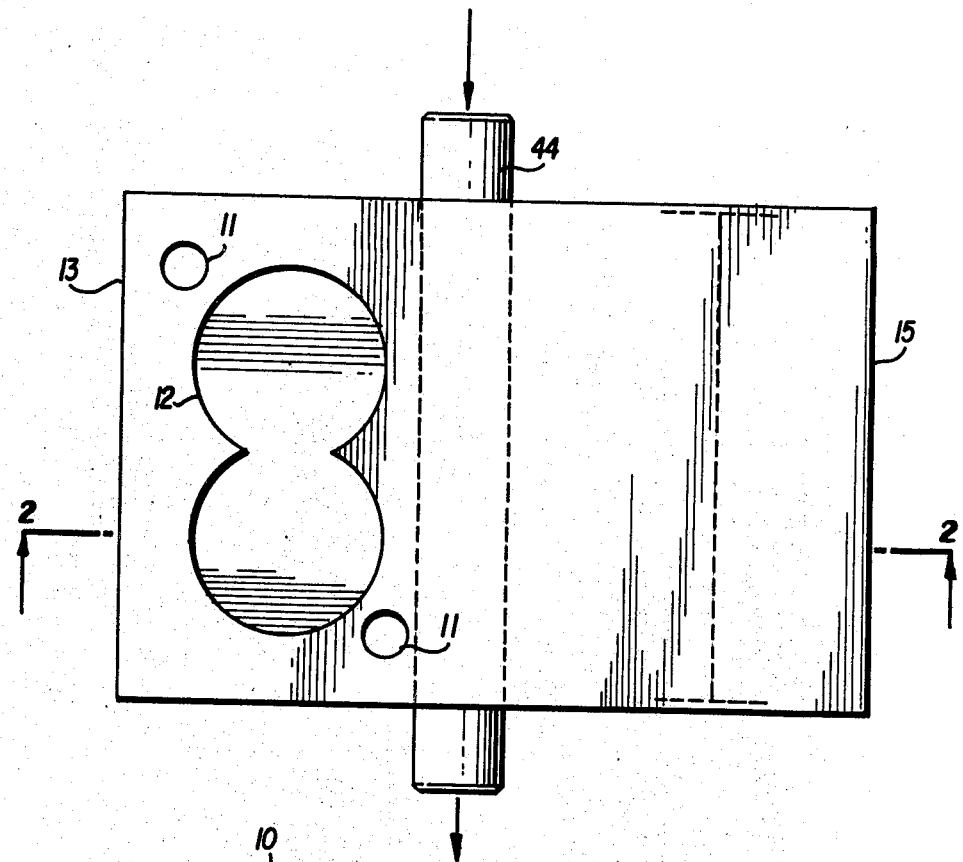
FIG. 3 is a top plan view of the invention.

The device as illustrated in FIGS. 1 through 3 represents a suitable construction adapted for use on a Chevrolet 262 cubic inch engine having a two-barrel down draft carburetor with throat openings of 2.75 inches each. The sidewalls 13 and 15 of such device are 5 inches wide, as viewed in FIG. 3. Through testing and development of the invention it has been found that the critical dimension for the device is a ratio of the cross-sectional area of the carburetor outlet to the cross-sectional area of constriction 52. An increase in this ratio, i.e., a reduction of the area of constriction 52, will produce an improvement in the fuel economy of the engine. Conversely, reducing this ratio by increasing the area of the passageway relative to the carburetor outlet improved performance, but with a corresponding loss of fuel economy. Performance has been found to be adversely affected at ratios in excess of 12:1. Presently, it is preferred to use a ratio of 9.50 to 1 to achieve a harmonious balance between performance and fuel economy.

For engines having carburetors of different size than that described above, selection of the appropriate dimensions for the device is governed by the same relative ratio and relationships. That is to say, with a given sidewall width, the smaller the opening between heat exchange tube 44 and upper plate 16, the greater the fuel economy. For use with a four-barrel carburetor, similar relationships would govern. The ratio, however, being dictated by the cross-sectional area of the primary barrels only.

Figure 4:
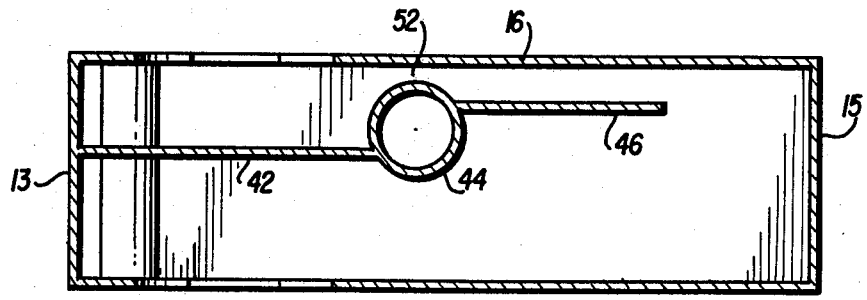
FIG. 4 is a modified form of the invention of FIG. 2, showing an alternative disposition of the mixing plate.

A modified form of baffle assembly 40 is shown in FIG. 4. In this arrangement deflection plate 42, the longitudinal axis of heat exchange tube 44, and mixing plate 46 lie in separate but parallel planes. Since the top surface of heat exchanger 44 is effectively lowered with respect to the deflection plate 42, the FIG. 4 arrangement permits construction of devices having reduced vertical dimension, i.e., sidewalls 13 and 15 are smaller than for the device shown in FIG. 2. Since the critical dimension for constriction 52 is maintained, the same performance may be achieved. The positioning of mixing plate 46 provides a different but equally effective turbulent affect upon the mixture.

Figure 5:
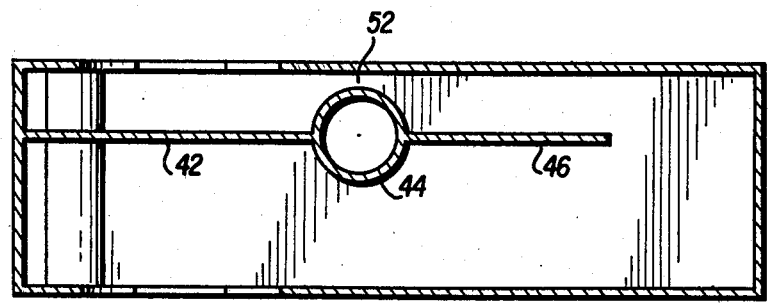
FIG. 5 is also a modified form of the invention shown in FIG. 2.

Yet another configuration for baffle assembly 40 is shown in FIG. 5. In this embodiment, deflection plate 42, the longitudinal axis of heat exchanger 44, and mixing plate 46 lie in the same plane. This construction allows an even further reduction in the overall vertical dimension of the device.

Figure 6:
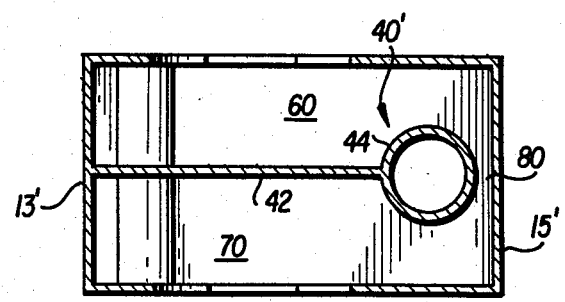
FIG. 6 is an alternative form of the invention which does not include the mixing plate.

FIG. 6 shows an alternative embodiment of the baffle assembly 40' which eliminates a mixing plate. As shown, the assembly 40' which consists of deflection plate 42 and heat exchanger 44, substantially separates the interior of the housing into an upper chamber 60 and a lower chamber 70. These chambers are interconnected through a channel 80 which lies between the heat exchanger 44 and sidewall 15'. Channel 80 provides the constriction in the passageway through the device which provides the increase in velocity necessary to realize the objectives of this invention. It will be appreciated that the FIG. 6 embodiment allows for a very compact construction of the device. Each of the forementioned devices result in enhancement of the vaporization of the fuel droplets and the intermixture thereof with air. These results are achieved without directly restricting the flow of the mixture, thus avoiding an undesirable enrichment of the mixture. Moreover, there is provided a significantly improved fuel economy as well as a substantial reduction in the emission of pollutants in the engine exhaust.

We claim:

1. A fuel economizing and pollution reducing device for an internal combustion engine of the type having a carburetor and an intake manifold, said carburetor having an outlet for delivering an air-fuel mixture to an inlet of said manifold, comprising:

(a) a housing, said housing defining an internal passageway for conducting a flow of an air-fuel mixture from the carburetor downstream to the manifold, said housing including an inlet end having communication with said carburetor outlet and an outlet end having a communication with said manifold inlet; and (b) a baffle assembly disposed within the interior of said housing, said baffle assembly including a heat exchanger and a deflection plate, said heat exchanger being positioned to provide a constriction of the internal passageway of said housing downstream of said carburetor, said deflection plate being positioned contiguous to said heat exchanger to direct the flow of the air-fuel mixture through said constriction, said heat exchanger being heated by the circulation therethrough of hot exhaust gases from said engine; and (c) wherein said heat exchanger comprises a hollow cylindrical tube, said tube extending through said housing and generally transverse to the flow of fuel-air mixture through said internal passageway; and (d) wherein said inlet end defines a flat upper plate and said outlet end defines a flat lower plate, said upper plate and said lower plate being disposed in parallel spaced relation, and wherein said constriction of the internal passageway is provided between said cylindrical tube and said upper plate; and (e) wherein said baffle assembly includes a mixing plate, said mixing plate being disposed downstream of said constriction; and (f) wherein said deflection plate and said mixing plate are each disposed in parallel spaced relation to said upper and lower plates, and wherein the longitudinal axis of said cylindrical tube lies in a plane which is parallel to said upper and lower plates.

2. The device of claim 1 wherein the upper plate of said housing includes an inlet port, said inlet port having a cross-sectional area at least as great as the cross-sectional area of said carburetor outlet, and wherein the lower plate of said housing includes an outlet port, said outlet port having a cross-sectional area at least as great as the cross-sectional area of said manifold inlet.

3. The device of claim 2 wherein said deflection plate, said mixing plate, and the longitudinal axis of said cylindrical tube are disposed in coplanar relationship.

4. The device of claim 2 wherein said deflection plate and the longitudinal axis of said cylindrical tube are disposed in coplanar relationship, and wherein said mixing plate is disposed in parallel relation to said deflection plate.

5. The device of claim 2 wherein said deflection plate and said mixing plate are disposed in contiguous coplanar relation, forming a generally unitary plate, and wherein said cylindrical tube is disposed upon said unitary plate.

6. The device according to claim 2 wherein said deflection plate, said mixing plate, and the longitudinal axis of said cylindrical tube are disposed in spaced relationship.

7. The device according to claims 2, 3, 4, 5, or 6 wherein the cross-sectional area of said carburetor outlet is related to the cross-sectional area of the passageway at said constriction by a 9.5:1 ratio.

8. A fuel economizing and pollution reducing device for an internal combustion engine of the type having a carburetor and an intake manifold, said carburetor having an outlet for delivering an air-fuel mixture to an inlet of said manifold, comprising:

(a) a housing, said housing defining an internal passageway for conducting a flow of air-fuel mixture from the carburetor downstream to the manifold, said housing including:
  (a) 1. an inlet end having communication with said carburetor outlet, and
  (a) 2. an outlet end having a communication with said manifold inlet; and (b) a baffle assembly disposed within the interior of said housing, said baffle assembly including a
  (b) 1. hollow cylindrical tube heat exchanger, said tube extending through said housing and generally transverse to the flow of fuel-air mixture through said internal passageway, and
  (b) 2. a deflection plate, said heat exchanger being positioned to provide a constriction of the internal passageway of said housing downstream of said carburetor, said deflection plate being positioned contiguous to said heat exchanger to direct the flow of the air-fuel mixture through said constriction, said heat exchanger being heated by the circulation therethrough of hot exhaust gases from said engine; and (c) said inlet end defining a flat upper plate and said outlet end defining a flat lower plate, said upper plate and said lower plate being disposed in parallel spaced relation, and wherein said constriction of the internal passageway is provided between the top of said cylindrical heat exchanger tube and said upper plate.

* * * * *